Aug. 15, 1933.  C. W. MILLET  1,922,556

CASTER WHEEL

Filed Sept. 2, 1930

Inventor,
Charles W. Millet
Frank C. Gore
By his Atty.

Patented Aug. 15, 1933

1,922,556

UNITED STATES PATENT OFFICE 1,922,556

CASTER WHEEL

Charles W. Millet, Evansville, Ind.

Application September 2, 1930
Serial No. 479,360

1 Claim. (Cl. 16—45)

The present invention relates to an improved caster wheel for furniture and other purposes and has for its object the provision of a novel caster wheel body and tread which will be waterproof, of very long life, inexpensive to manufacture, will hold its shape, retain a relatively smooth periphery, have no tendency to scrape or mar the floor, and may be stamped out of specially prepared sheet material and used in one or more thicknesses, according to the width of caster desired.

The body of the caster wheel is stamped out of sheet material commonly used for belting and known to the trade as "fabrica" and "pro-tex." This specially prepared belting material is a rubber and fabric composition compressed into very solid consistency and is very durable and it comes in different thicknesses.

According to the thickness of body and tread desired, the disc-like stamping from the belting will be of a single thickness, or, two or more stampings will be arranged side by side to constitute the body and tread of the caster wheel, according to the width of the caster wheel desired. The disc-like stampings are held between metal discs through which, and through the body of the caster wheel, passes a sleeve which is upset against the metal discs and thus clamps the discs to the fabrica body. The sleeve receives the pintle carried by the metal part or frame of the caster wheel.

Figure 1:
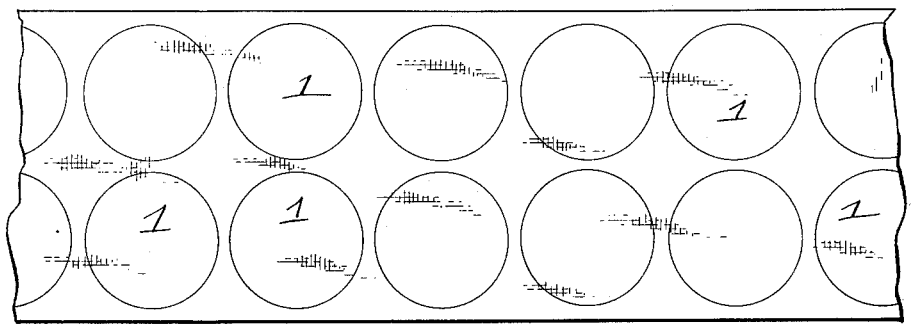
Figure 1 is a plan view, showing a part of a "fabrica" or "pro-tex" belt, the circles representing the manner in which discs may be stamped or cut out of the belt fabric to produce the discs shown in Fig. 2.
Figure 2:
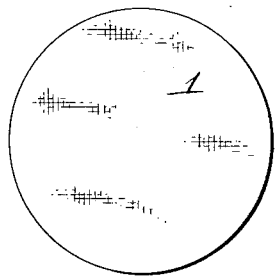
Fig. 2 is a face view of a "fabrica" or "pro-tex" fabric and rubber composition disc such as used in my caster, which may be stamped out of a sheet of belt shown in Fig. 1.
Figure 3:
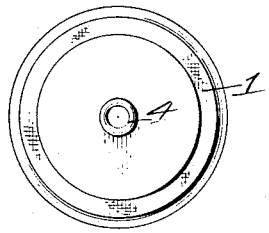
Fig. 3 is a side elevation of the caster wheel.
Figure 4:
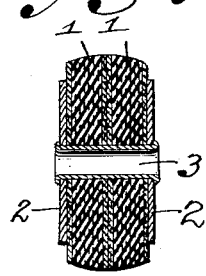
Fig. 4 is a cross section therethrough.

A sheet of the belting material of "fabrica" or "pro-tex" of the fabric and rubber composition described, is used for obtaining the discs employed in the caster wheel, one of such discs, before embodiment in the caster wheel, being shown at 1.

According to the thickness of the tread of the caster, that is, the kind of caster wheel it is desired to produce, one or more of the stamped discs 1 are employed. If a narrow caster wheel is desired, only one such disc will be used. By adding additional discs, a caster wheel of any desired width can be made. The disc or discs 1 comprising the body and tread of the caster wheel, are clamped between the metal discs 2 located on opposite sides thereof, and provided with holes therethrough. The disc or discs 1 have a central bore, and there is a tube or sleeve 3 which passes through the holes in the respective discs and is upset at its ends 4 against the metal disc 2, under pressure, whereby the parts 1, 2, 3 are united so as to constitute a unit.

The pintle of the caster wheel frame is passed through the tube or sleeve 3.

The tread is suitably rounded, as is customary in wheels.

In the complete caster wheel illustrated, there are two of the discs 1 located side by side.

What I claim is:

A caster wheel whose body and tread solely comprise a plurality of inherently rigid discs each of rubber compound and fabric material located side by side which have been compressed into solid consistency before being embodied in the caster, wheel and mounting means therefor embodying metal discs located at the sides of the body, and a tube or sleeve extending through the center of all of the aforesaid discs and connecting them together, said first-named discs being adapted to support the weight borne by the caster without dependence on the said metal discs.

CHARLES W. MILLET.